US007669863B2

(12) United States Patent
Steiner et al.

(10) Patent No.: US 7,669,863 B2
(45) Date of Patent: Mar. 2, 2010

(54) WALKER WITH LIFT-ASSISTING SEAT ASSEMBLY

(75) Inventors: Mark Steiner, Slingerlands, NY (US); James Signor, Port Crane, NY (US); Michael Heligman, Huntington Beach, CA (US); Danielle Kocher, Middletown, CT (US); Tyler E. Bellamy, Newport News, VA (US)

(73) Assignee: Rensselaer Polytechnic Institute, Troy, NY (US)

( * ) Notice: Subject to any disclaimer, the term of this patent is extended or adjusted under 35 U.S.C. 154(b) by 257 days.

(21) Appl. No.: 11/626,194

(22) Filed: Jan. 23, 2007

(65) Prior Publication Data

US 2007/0194547 A1 Aug. 23, 2007

Related U.S. Application Data

(60) Provisional application No. 60/761,728, filed on Jan. 24, 2006.

(51) Int. Cl.
*B62M 1/00* (2006.01)

(52) U.S. Cl. ................. 280/87.05; 280/648; 280/250.1; 297/5

(58) Field of Classification Search ............ 280/87.041, 280/87.005, 87.021, 643, 642, 648, 650, 280/87.05; 135/65, 66, 74, 85; 297/5, 93, 297/123
See application file for complete search history.

(56) References Cited

U.S. PATENT DOCUMENTS

| | | | | |
|---|---|---|---|---|
| 2,866,495 A | | 12/1958 | Diehl et al. | |
| 4,941,708 A | | 7/1990 | Heffner et al. | |
| 4,979,726 A | | 12/1990 | Geraci | |
| 5,316,370 A | | 5/1994 | Newman | |
| 5,320,122 A | | 6/1994 | Jacobson, II et al. | |
| 5,353,824 A | * | 10/1994 | Woods et al. | 297/44 |
| 5,364,120 A | * | 11/1994 | Shimansky | 280/650 |
| 5,419,571 A | * | 5/1995 | Vaughan | 280/250.1 |
| 5,451,193 A | * | 9/1995 | Pickard | 482/68 |
| 5,716,063 A | | 2/1998 | Doyle et al. | |
| 5,904,168 A | * | 5/1999 | Alulyan | 135/65 |
| 6,068,273 A | | 5/2000 | Rao et al. | |

(Continued)

FOREIGN PATENT DOCUMENTS

JP 2001-87316 4/2001

OTHER PUBLICATIONS

U.S. Appl. No. 60/761,728, filed Jan. 24, 2006, Signor, et al.

(Continued)

*Primary Examiner*—Hau V Phan
(74) *Attorney, Agent, or Firm*—Heslin Rothenberg Farley & Mesiti P.C.

(57) ABSTRACT

A walker for use by those with limited mobility. The walker includes a seat assembly that assists the user in rising from a seated position or sitting from a standing position. The seat assembly is mounted in a frame and includes at least one gas spring mounted between the seat assembly and the frame that deflects the seat assembly while the user is rising from the seat or dampens the deflection of the seat when the user is sitting. The walker may include other capabilities and attachments, including a braking system and mountings for ancillary equipment.

34 Claims, 9 Drawing Sheets

U.S. PATENT DOCUMENTS

| | | | | |
|---|---|---|---|---|
| 6,099,002 | A * | 8/2000 | Uchiyama | 280/87.021 |
| 6,202,502 | B1 | 3/2001 | Chung-Che | |
| 6,311,708 | B1 | 11/2001 | Howle | |
| 6,338,493 | B1 | 1/2002 | Wohlgemuth et al. | |
| 6,340,168 | B1 * | 1/2002 | Woleen | 280/643 |
| 6,371,142 | B1 * | 4/2002 | Battiston | 135/67 |
| 6,494,469 | B1 | 12/2002 | Hara et al. | |
| 6,733,018 | B2 | 5/2004 | Razon | |
| 7,000,988 | B2 | 2/2006 | Bressler et al. | |
| 7,040,637 | B2 | 5/2006 | Owens et al. | |
| 7,052,030 | B2 * | 5/2006 | Serhan | 280/304.1 |
| 7,219,906 | B2 * | 5/2007 | Hallgrimsson et al. | 280/87.041 |
| 2002/0050427 | A1 | 5/2002 | Lee | |
| 2002/0082148 | A1 | 6/2002 | Kuntz | |
| 2003/0137199 | A1 | 7/2003 | Razon | |
| 2004/0118640 | A1 | 6/2004 | Hallgrimsson | |
| 2004/0201191 | A1 | 10/2004 | Jacques, II et al. | |

OTHER PUBLICATIONS

Merry Traveler® Website: http://www.merrywalker.com/traveler.html.

Dolomite Rollator Website: http://www.phc-online.com/SearchResults.asp?Search=dolomite+rollator.

Wenzelite Model No. CE 1200: http://Edmond-wheelchair.com.

* cited by examiner

WALKER WITH LIFT-ASSISTING SEAT ASSEMBLY

CROSS-REFERENCE TO RELATED APPLICATION

This application claims priority from U.S. Provisional Patent Application 60/761,728, filed on Jan. 24, 2006, the disclosure of which is included by reference herein in its entirety.

TECHNICAL FIELD

The present invention is related to the field of ambulatory assist devices, that is, walkers. Specifically, aspects of the invention provide posterior walkers having seat assemblies that are adapted to assist the user in rising from a seated position to a standing position or sitting from a standing position.

BACKGROUND OF THE INVENTION

It is commonly accepted that the population of the U.S. is getting older. For example, studies performed by the State of Utah, and documented on the university's Home Health, Hospice, and Elder Care Website, indicate that, over the next 25 years, the elderly population is projected to increase 80%. As the "baby boomer" generation ages, America is facing an increase in an elderly population requiring technologies that compensate for the effects of age.

Unfortunately, a side effect of aging is decreased mobility. According to the U.S. Census Bureau, out of a base of 2,333, 555 elderly persons, about 40% of them are considered disabled in the State of New York alone. Disability often leads to immobility, which can then lead to inactivity. Inactivity has been noted to be the cause of some major health problems in elderly populations. Many physical ailments have been associated with aging, such as, a decrease in muscle mass and a decrease in maximum heart rate. Conversely, modest exercise has been shown to have countless benefits, including improved bone density, improved functions in osteoarthritis, and reduction in coronary artery disease. Recent studies even suggestion that increased physical activity in senior citizens may prevent the onset of dementia.

As the population ages, the need for ambulatory assisting devices will only increase. With the aging of the population, relatively common activities such as walking and standing will become more difficult for many. As a result, many elderly will find it harder to get from place to place by themselves and may often need help from others or from mechanical devices, such as "walkers." Besides the elderly, others may also be in need of ambulatory assistance, for example, those recovering from debilitating injury or surgery.

According to contemporary understanding, ambulatory assist devices, such as walkers, typically reduce stress and strain on the musculoskeletal system allowing the user to move about with greater ease. For example, one of the advantages of such devices is that they reduce the turning moments on key joints in the lower half of the human body needed for movement. In addition, these devices also decrease the angular impulse needed to initiate motion. As is known in the art, the three major skeletal systems that are targeted by these aids are the hip flexor/extensor, the knee flexor/extensor, and the ankle plantar flexor/extensor. Ambulatory assist device typically reduce the movements, angular impulses, and strain in these joints.

However, prior art ambulatory assisting device fail to provide assistance for a relatively common bodily motion: transitioning from a sitting position to a standing position, for example, to a standing position prior to walking. The prior art is replete with ambulatory assisting devices; however, none of the prior art devices provide assistance for this common motion. Aspects of the present invention were developed in response to the recognized need.

A review of the existing walker technology reveals the availability of two types of walkers: "anterior" and "posterior" walkers. As their names imply, anterior walkers include a frame in front of the user that is essentially pushed along by the user; posterior walkers include a frame behind the user that is essentially dragged by the user. One significant distinction between the two designs is that the posterior type walker typically permits the user to perform typical activities, for example, household activities, such as approaching counters, sinks, stoves, and tables, without interference by the posterior walker. Conventional anterior walkers typically obstruct such common activities. Thus, in one aspect of the present invention, a posterior walker is provided.

Existing lift-assisting technology includes the lift-assisted cushion described in U.S. Pat. No. 5,316,370 and marketed under the name Up Easy Lifting Cushion by Uplift Technologies; the lifting harness described in U.S. Pat. No. 6,733,018; and the lifting handles disclosed in published U.S. Patent Application 2002/0082148. However, upon evaluation by the inventors, none of these lifting mechanisms were found to effectively address the complex motion of standing from a sitting position. U.S. Pat. No. 5,320,122 discloses a wheeled anterior walker having a spring-biased seat, but again this device does not effectively address the complex motion of standing from a sitting position.

One existing posterior walker is provided by Wenzelite, for example, model number CE 1200 provided by Edmond Wheelchair Supply [http://Edmond-wheelchair.com]. However, the Wenzelite walker provides no lift assistance. Attempts by the inventors to incorporate the Left Chair mechanism referenced above with the posterior Wenzelite walker were unsuccessful. The inventors found that this combination did not address the issue of how to effectively move the seating surface out of the walking area once the user was standing. Other walkers include the Merry Traveler® posterior walker [www.merrywalker.com/traveler.html] and the Dolomite Rollator anterior walker [www.phc-online.com/dolomite rollator.html]. These walkers also provide no lift assistance.

Japanese Publication No. 2001087316 discloses an anterior walker having an adjustable seat driven by a gas cylinder and a guide screw. However, this device is limited to simply raising an elderly person from a position on the floor to a position above the floor. Again, this device provides no assistance in lifting a person from the seated position to a standing position.

Aspects of the invention provide advantages and improvements not found in these and other prior art. Specifically, prior art ambulatory assisting devices fail to provide assistance for a relatively common bodily motion: transitioning from a sitting position to a standing position.

SUMMARY OF THE INVENTION

One aspect of the invention is a walker, for example, a posterior walker, including a frame assembly having a lower frame assembly adapted to contact the ground a plurality of uprights mounted to the lower frame assembly, the plurality of uprights comprising a plurality of front uprights and a plurality of rear uprights; and an upper frame assembly mounted to the plurality of uprights; two handles mounted to the upper frame assembly, the two handles positioned to assist a user when walking; a seat assembly having a first end pivotally mounted to the lower frame assembly, and a second end mounted to the rear uprights; and means for assisting the user in rising from the seat assembly. The means for assisting the user may comprise at least one gas spring having a first end comprising an extendable rod pivotally mounted to the seat assembly and a second end pivotally mounted to the lower frame assembly.

Another aspect of the invention is a method for using a walker, the method including providing a walker having a frame assembly, and a seat assembly mounted in the frame assembly; sitting on the seat assembly in a first position; rising from the seat assembly; and allowing the seat assembly to deflect to a second position, higher than the first position, while providing at least some support to the seat assembly. In one aspect, providing at least some support to the seat assembly comprises providing a lifting force to the seat assembly, for example, by positioning a force providing device, such as a gas spring, between the seat assembly and the lower frame assembly.

A further aspect of the invention is a posterior walker including a frame assembly having a lower frame assembly having a plurality of wheels; a plurality of uprights mounted to the lower frame assembly, the plurality of uprights comprising a plurality of front uprights and a plurality of rear uprights; and an upper frame assembly mounted to the plurality of uprights; two handles mounted to the upper frame assembly, the two handles positioned to assist a user when walking; a seat assembly having a first end pivotally mounted to the lower frame assembly by a plurality of bars, and a second end slidably mounted to slots in the rear uprights; and at least one gas spring having a first end comprising an extendable rod pivotally mounted to the seat assembly and a second end pivotally mounted to the lower frame assembly. In one aspect, the second end of the seat assembly includes a plurality of dowels and each of the slots of the rear uprights are adapted to receive one of the plurality of dowels to guide the slidable mounting of the seat assembly.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION

Figure 1:
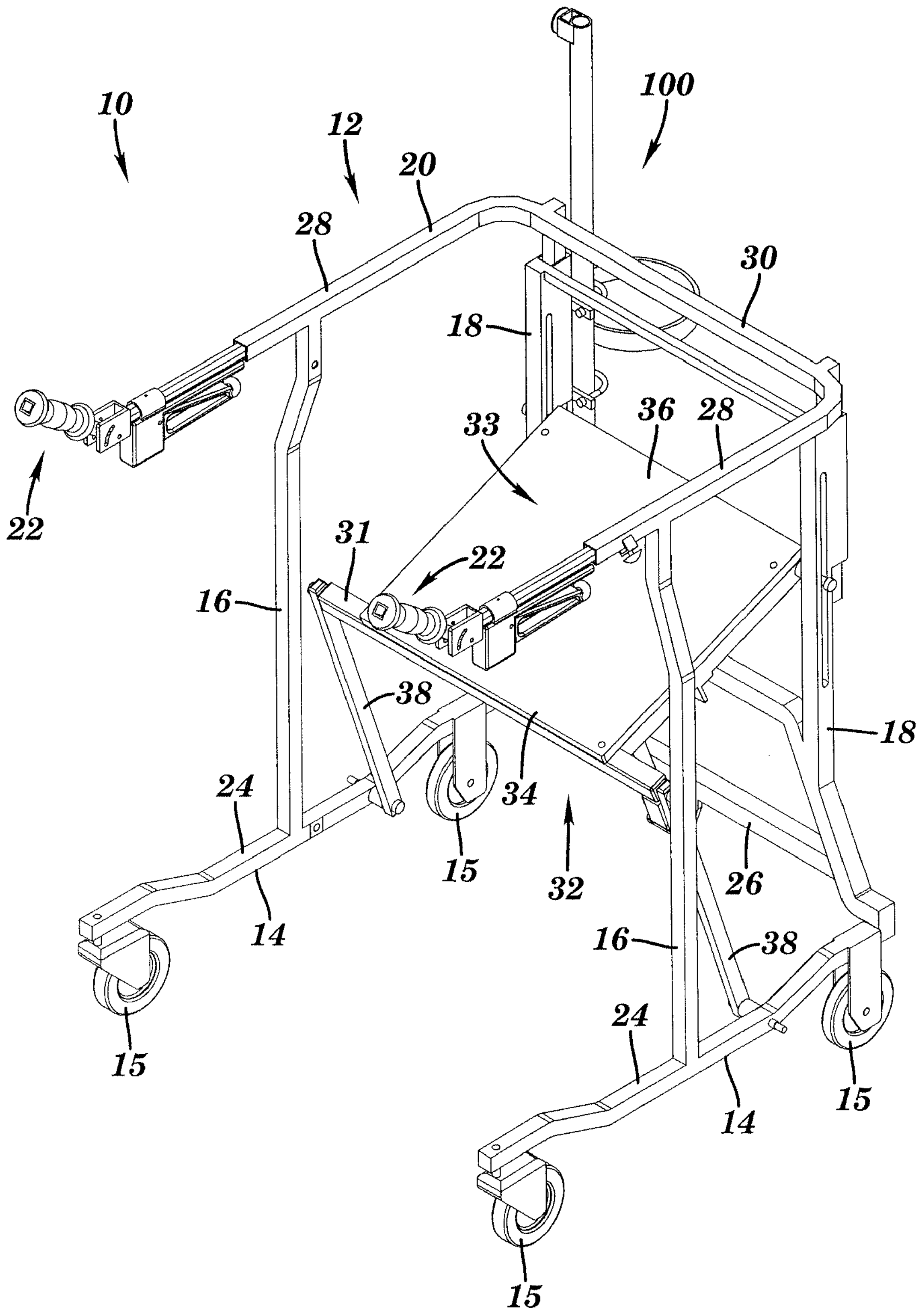
FIG. 1 is a front perspective view of a posterior walker according to one aspect of the present invention.
Figure 2:
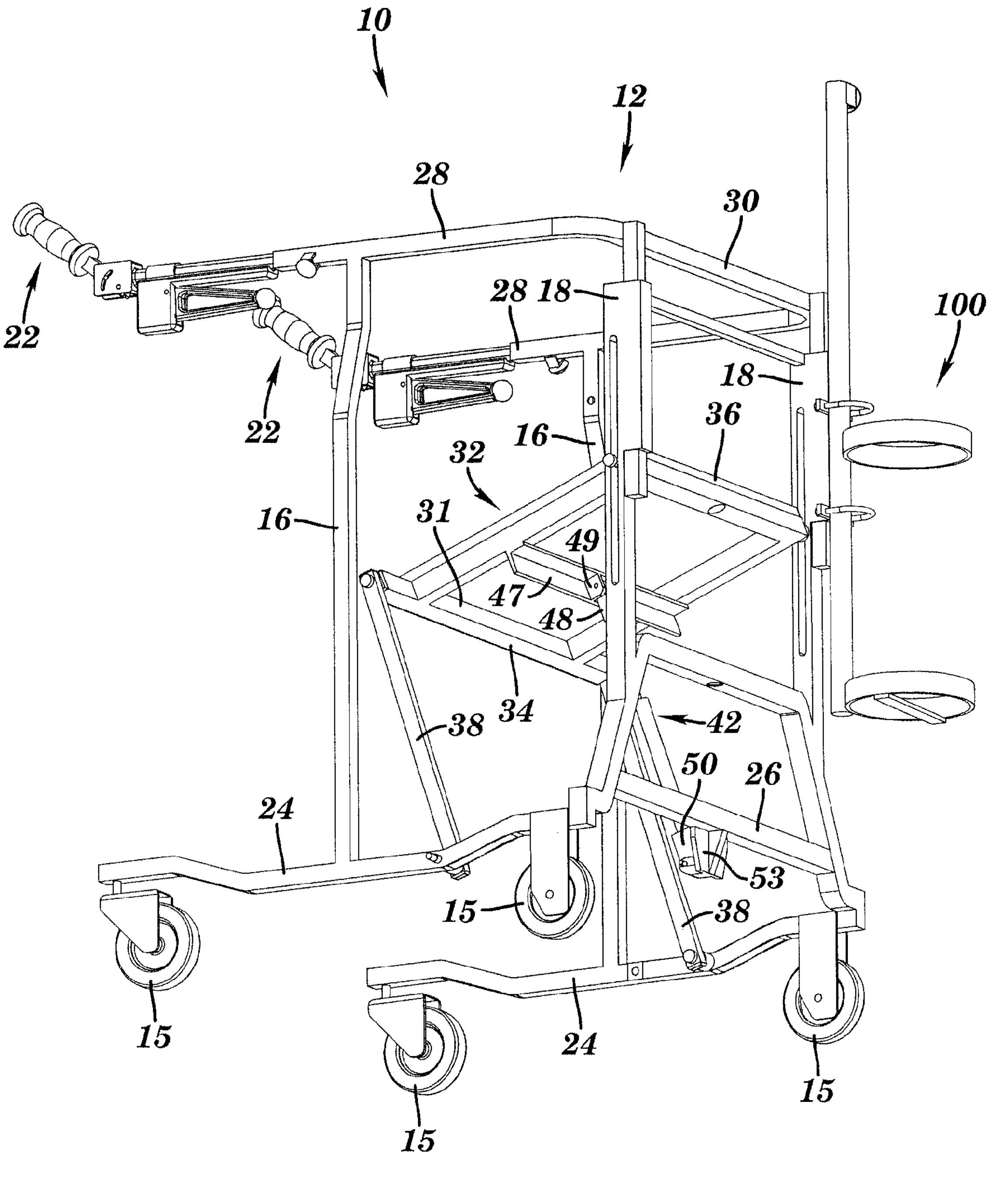
FIG. 2 is a rear perspective view of the walker shown in FIG. 1.
Figure 3:
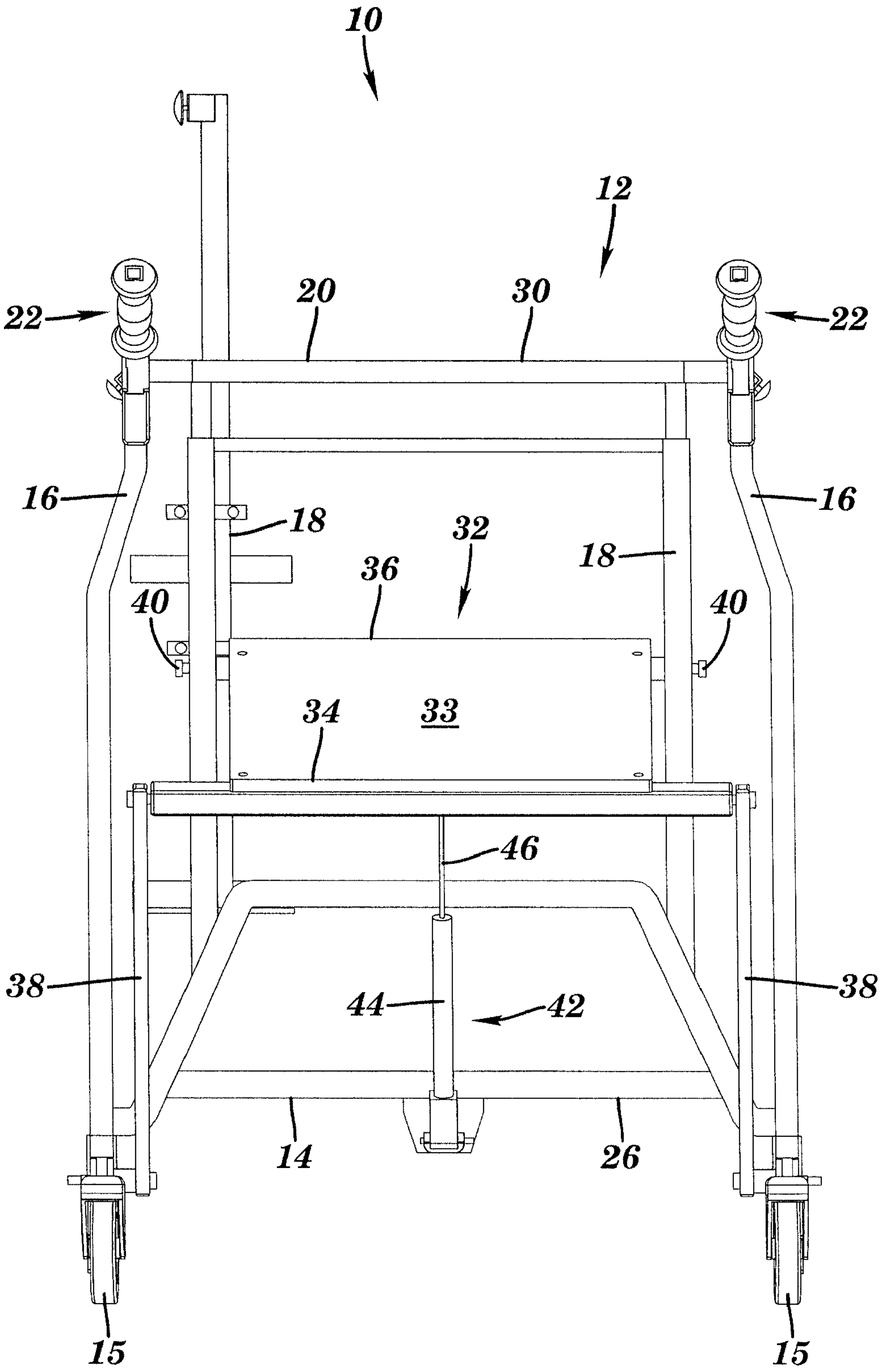
FIG. 3 is a front elevation view of the walker shown in FIG. 1.
Figure 4:
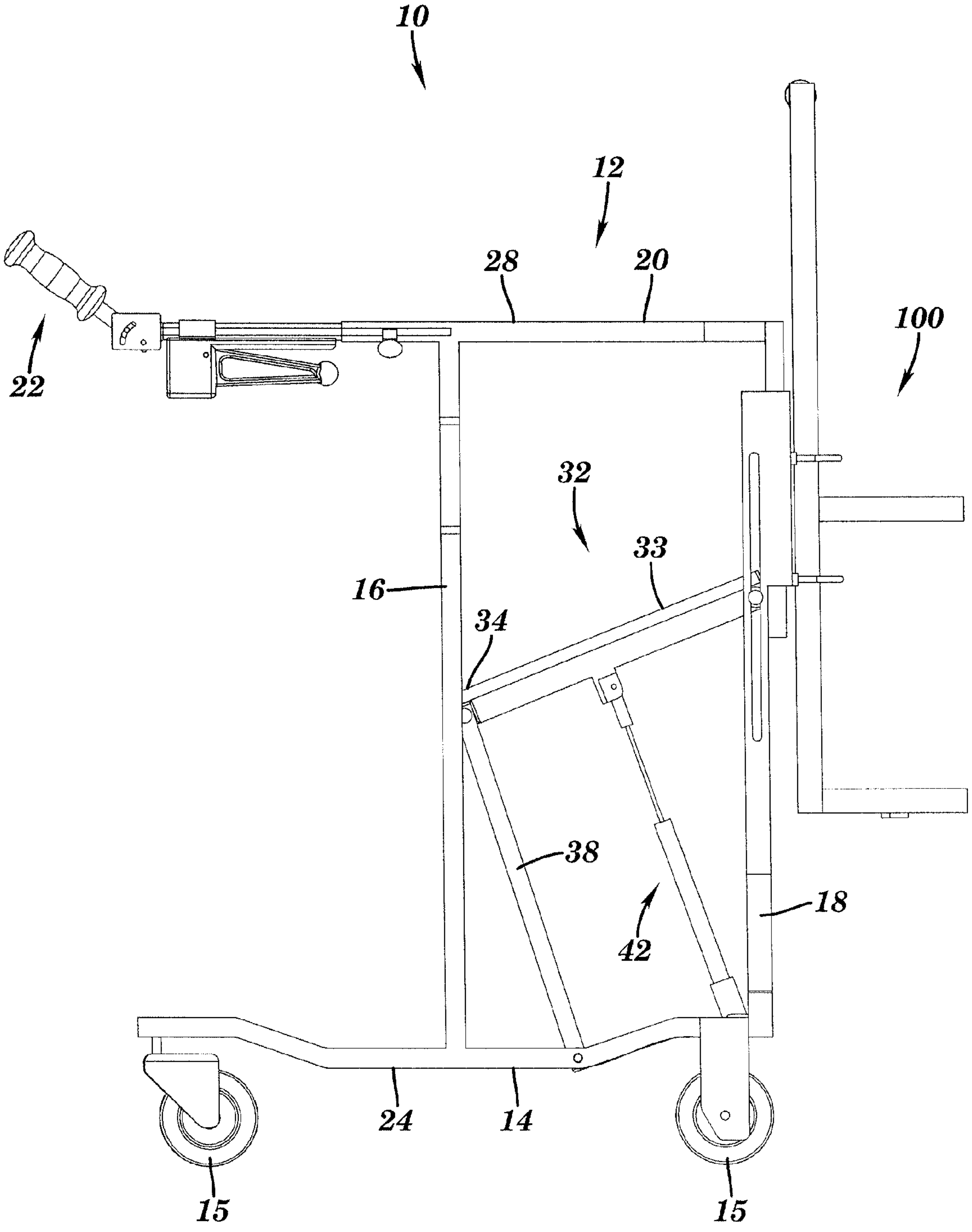
FIG. 4 is a side elevation view of the walker shown in FIG. 1.
Figure 5:
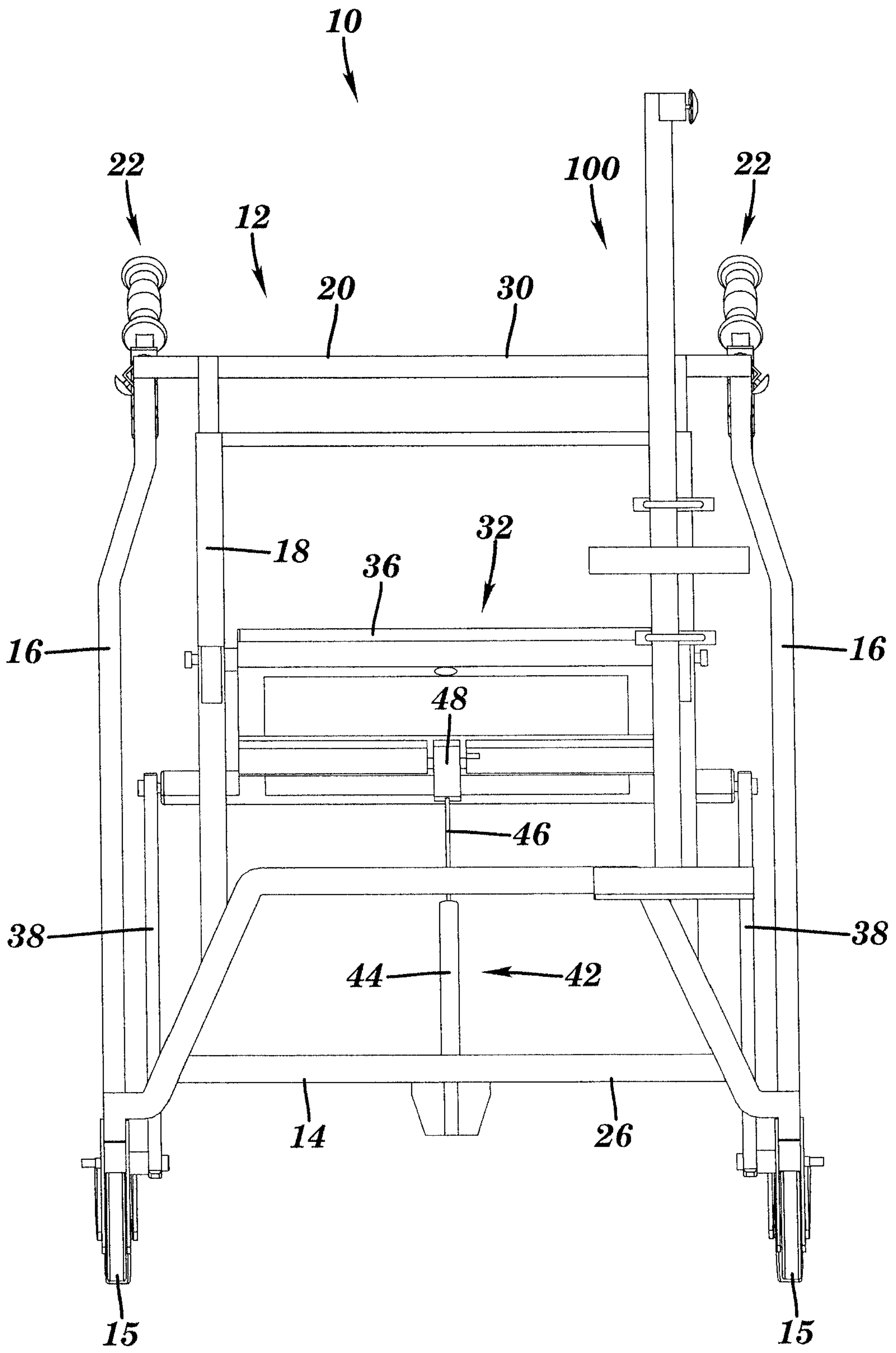
FIG. 5 is a rear elevation view of the walker shown in FIG. 1.

The present invention provides an ambulatory assist device, that is, a "walker," having a lift-assisting seat assembly that assists the user in rising from a seated to a standing position. The seat assembly may be retracted to avoid interfering with the user when the user rises to walk. FIG. 1 is a perspective view of a posterior walker 10 according to one aspect of the present invention. FIG. 2 is a rear perspective view of walker 10 shown in FIG. 1. FIG. 3 is a front elevation view of walker 10 shown in FIG. 1; FIG. 4 is a side elevations view of walker 10 shown in FIG. 1; and FIG. 5 is a rear elevation view of walker 10 shown in FIG. 1. As shown, walker 10 includes a frame assembly 12 which includes a lower frame assembly 14 having a plurality of wheels 15, a plurality of uprights 16 and 18 mounted to the lower assembly 14, and an upper frame assembly 20 mounted to the plurality of uprights 16 and 18. The plurality of uprights 16 and 18 comprise a plurality of front uprights 16 and a plurality of rear uprights 18.

As shown in FIGS. 1-4, lower frame assembly 14 may be U-shaped in construction and may include at least two substantially parallel members 24 and at least one cross member 26. Wheels 15 may typically be mounted to members 24, for example, wheels 15 may be pivotally mounted adjacent the ends of members 24. Wheels 15 may be housed in conventional casters. As also shown in FIGS. 1-4, upper frame assembly 12 may also be U-shaped in construction and include at least two substantially parallel members 28 and at least one cross member 30. Walker 10 may also include two handle assemblies 22 mounted to members 28, for example, mounted to the ends of members 28, which typically assist the user in moving walker 10 and maintaining an upright position when walking.

According to aspects of the invention, walker 10 also includes a seat assembly 32. Seat assembly 32 may be adapted to function as a seating surface for the user, may be adapted to provide a lifting force to the user when sitting or standing, and also may be adapted to retract when the user rises, that is, to avoid interference with the user when walking with the aid of walker 10. Seating assembly 32 typically includes a padded seating surface 33, for example, a washable, non-absorbent, padded seating surface. Seating assembly 32 includes a first or front end 34 and a second or rear end 36 opposite first end 34. According to aspects of the invention, first end 34 is pivotally mounted to the lower frame assembly 14, for example, by means of a plurality of bars, arms, or linkages 38. First end 34 may include a transverse member 31 to which linkages 38 may be pivotally mounted. Second end 36 is mounted, for example, pivotally mounted and/or slidably mounted, to the rear uprights 18. In one aspect, second end 36 may be pivotally mounted to rear uprights 18 by means of a plurality of bars, arms, or linkages (not shown), for example, as disclosed in parent provisional application 60/761,728, the disclosure of which was included by reference herein in its entirety.

Figure 7:
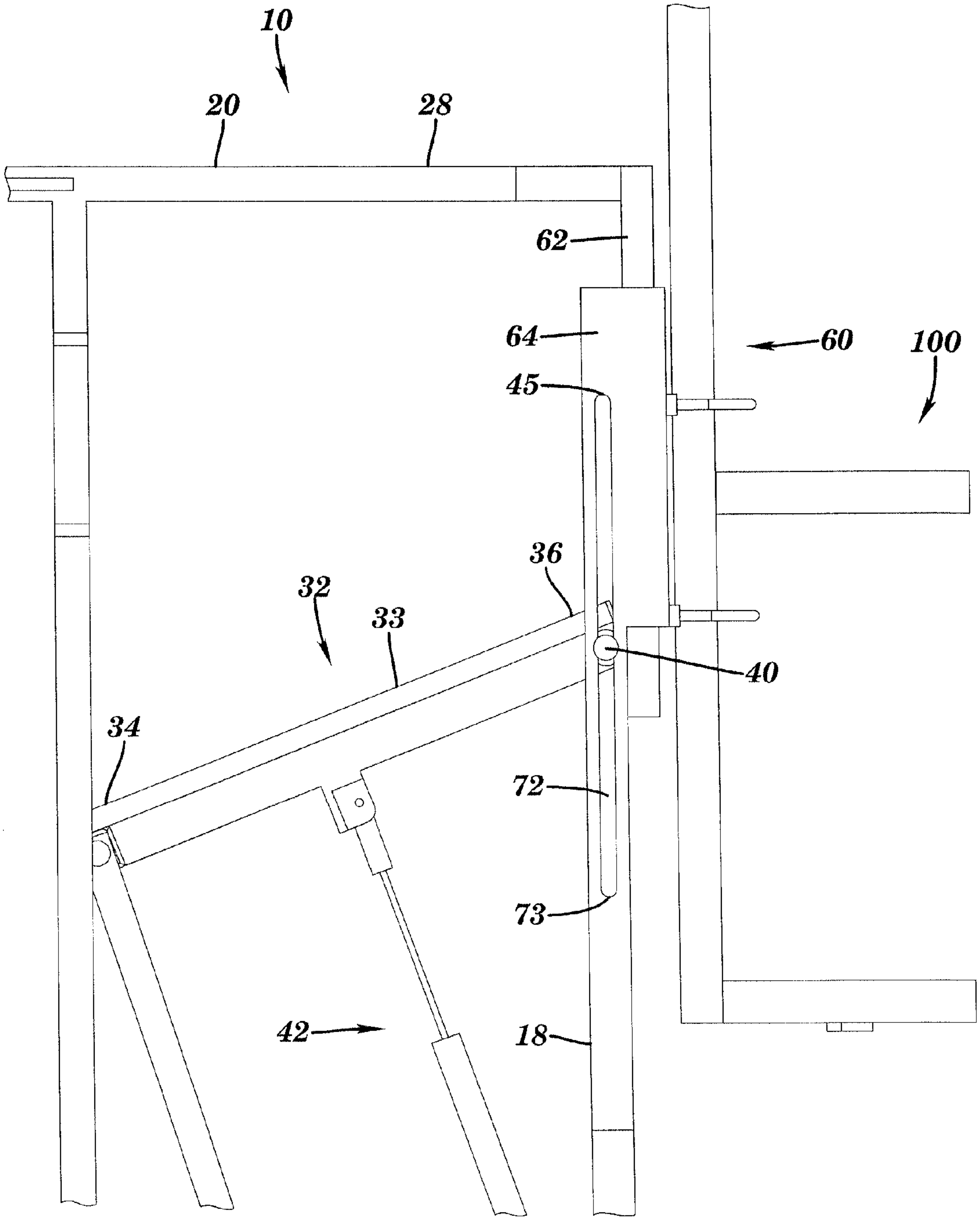
FIG. 7 is a detailed view of a means for mounting a seat assembly and a height adjustment mechanism that may be used in the walker shown in FIG. 1.

FIG. 7 is a detailed view of one means for slidably mounting seat assembly 32 to rear uprights 18. As shown in FIG. 7, second end 36 of seat assembly 32 may include a plurality of dowels or pins 40 and rear uprights 18 may each include a slot 72 adapted to receive the dowel or pin 40 and guide the movement of seat assembly 32. In one aspect, dowels 40 may comprise the ends of a rod or shaft mounted across second end 36 of seat assembly 32. As shown in FIG. 7, slot 72 typically includes a lower end 73 positioned to retain dowel 40 and support seat assembly 32 in a substantially horizontal position, for example, when walker 10 is being used as a seat. Slot 72 typically also includes an upper end 45 positioned to allow dowel pin 40 to translate to where seat assembly 32 is retracted against rear uprights 18 (See FIG. 8 below.), for example, when walker 10 is being used as a walker. Slot 72 may include one or more depressions or slots (not shown) adapted to receive dowels 40 and function as a detent wherein dowel 40 may be retained in one or more positions, for example, retained in a position where seat assembly 32 is retracted as close to uprights 18 as possible.

Figure 6:
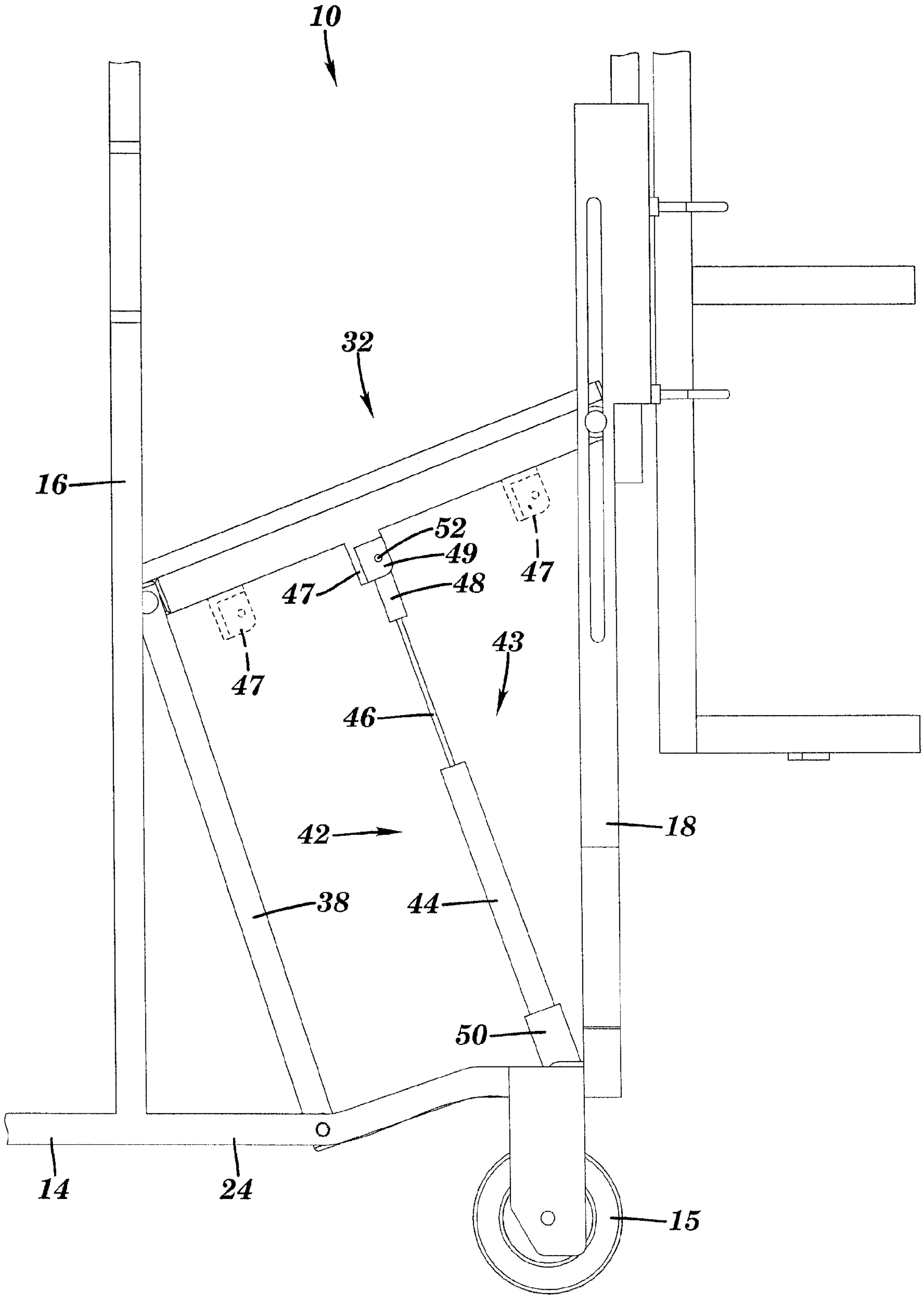
FIG. 6 is detailed view of a seat assembly lifting mechanism that may be used in the walker shown in FIG. 1.

As shown in FIGS. 2 and 3, according to aspects of the present invention, walker 10 also includes means 42 for assisting a user in rising from and/or sitting on seat assembly 32. In aspects of the invention, means 42 is capable of lifting a user at a speed and support force that approximates the user's natural body movement while providing a natural feeling to the movement while not interfering with the user. FIG. 6 is detailed side elevation view of one means 42 according to one aspect of the invention. As shown in FIG. 6, means 42 may comprise a gas spring 43, that is, a hydropneumatic element consisting of a tube 44, a piston rod 46 with piston (not shown) and appropriate connection fittings 48 and 50. Connection fitting 48 mounts, for example, pivotally mounts, gas spring 43 to seat assembly 32 and fitting 50 mounts, for example, pivotally mounts, gas spring 43 to lower frame assembly 14. (FIG. 2 may provide a clearer view of this mounting.) As shown in FIGS. 2 and 6, fitting 48 may comprise a conventional end fitting and mount to bracket 49 mounted on cross member 47 of seat assembly 32 by means of pin 52. Fitting 50 may comprise a conventional end fitting mounted to bracket 53 mounted to cross member 26.

Tube 44 of gas spring 43 is typically filled with a compressed gas, such as nitrogen, which acts with equal pressure on differently dimensioned cross-sectional areas of the piston (not shown). Typically, gas spring 43 produces a force in the direction of extension of rod 46. Gas spring 43 may be a Type 10 compression gas spring provided by Industrial Gas Springs, Inc. of West Chester, PA., or its equivalent.

In one aspect, the means 42 for assisting a user comprises variable means, that is, the force exerted by means 42, for example, gas spring 43, may be variable. By providing a variable force or stiffness, users of varying weights can comfortably be accommodated. For example, when a lighter weight child, teenager, or elderly person uses walker 10, means 42 can adjusted for a first force or stiffness and when a heavier person uses walker 10, means 42 may be adjusted to provide a second force or stiffness, greater than the first force or stiffness. When means 42 comprises a gas spring 43, the force or stiffness of gas spring 43 may be varied by varying the gas pressure within tube 44. For example, the higher the pressure the higher the force or stiffness. Gas spring 43 may typically be specified by the range of force that gas spring 43 can exert. In one aspect, the force that gas spring 43 provides may range from about 50 pounds to about 300 pounds, but is typically from about 90 pounds to about 180 pounds, depending upon the expected weight of the user.

Though a gas spring 43 is shown in FIG. 6, other means for assisting a user when rising and/or sitting may include one or more compression springs, one or more pneumatic or hydraulic cylinders, one or more pneumatic or hydraulic dampers, one or more electromagnetic damping devices, or one or more elastomeric damping or compressing devices, among others. These means may also be variable, that is, may provide a variable force or stiffness.

In one aspect of the invention, the point of attachment of means 42 on seat assembly 32 may be variable or adjustable. For example, as shown in phantom in FIG. 6, seat assembly 32 may include one or more brackets 49 mounted on one o more support members 47 and adapted to receive end-fitting 48. By varying the location of the point of attachment of means 42 on seat assembly 32, the movement of seat assembly 32 may be adjusted to accommodate a broad range of users. For example, by adjusting the location of the point of attachment of means 42, the movement of seat 32 during a user's transition from a seated position to a standing position can be made more fluent and natural, that is, more conducive to the user's personal motor function. In one aspect, two or more means 42, for example, two or more gas springs 43, may be mounted between seat assembly 32 and lower frame assembly 14. In another aspect of the invention, means 42 may be mounted to the sides of seat assembly 22, for example, a plurality of gas springs 43 may be mounted to side members (not shown) of seat assembly 32, for instance, slidably mounted in slot or track in the side member.

Figure 8:
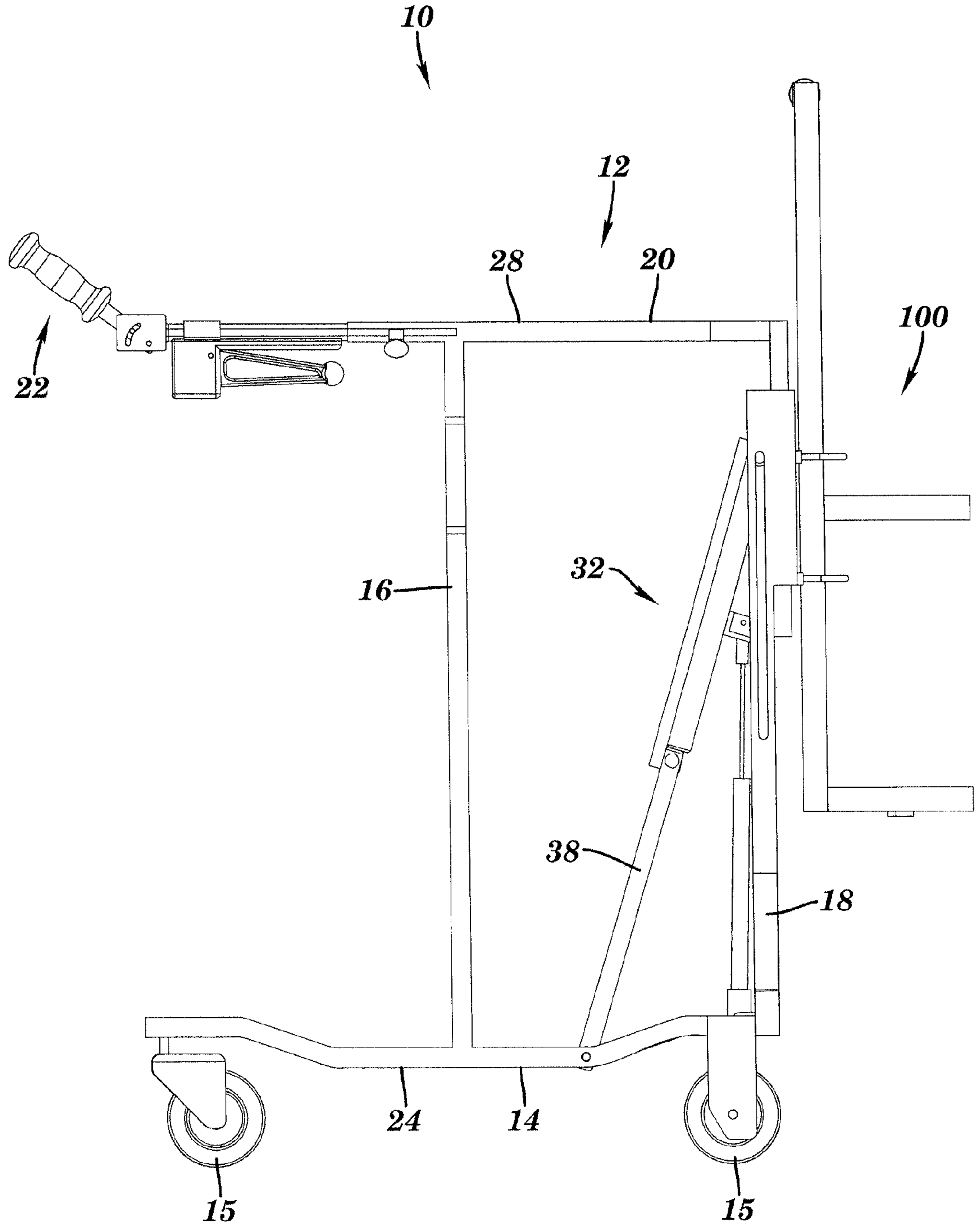
FIG. 8 is a side elevation view of the walker shown in FIG. 1, similar to FIG. 3, but illustrating the seat assembly in a retracted position.

According to aspects of the present invention, walker 10 may also comprise means for retracting seat assembly 32, for example, retracting seat assembly 32 whereby seat assembly 32 does not interfere with the use of walker 10 as a walker. In one aspect, seat assembly 32 in the unloaded state, for example, as shown in FIG. 4, does not interfere with the user when the user is standing and using walker 10 as a walker. That is, in one aspect, there is sufficient clearance between the front end 34 of seat assembly 32 and the user such that seat assembly 32 does not interfere with the user. In another aspect, seat assembly 32 may be retracted away from the user. FIG. 8 is a side elevation view of walker 10, similar to FIG. 3, illustrating seat assembly 32 in the retracted position, for example, as retracted against rear uprights 18. Seat assembly 32 may be retained by one or more detents in slots 72 that hold pins 40, or by some other conventional means. As shown, in the retracted position, the front end 34 of seat assembly 32 is further withdrawn from the area a user would typically stand when using walker 10 as a walker. In one aspect, at least some modification to cross beam 47 or bracket 49 may be made to accommodate the deflection of seat assembly 32 shown in FIG. 8.

In one aspect of the invention, the height or elevation of the upper frame assembly 20 may be variable to accommodate users of varying height, for example, the elevation of upper frame assembly 20 may be variable relative to lower frame assembly 14. One height adjustment mechanism 60 that may be used for aspects of the invention is illustrated in FIG. 7. As shown, in one aspect, rear uprights 18 may adjustably telescope to vary the height of upper frame 28. Specifically, rear upright 18 may comprise first or upper member 62 that slidably engages a second or lower member 64 having an internal cavity adapted to receive first member 62. Adjustment mechanism 60 may typically include one or more set screws (not shown) or pins (not shown) for retaining upper member 62 at the desired elevation within lower member 64. Though not shown in FIG. 7, in one aspect, front uprights 16 and 18 may also include adjustable telescoping members that can be used to vary the elevation of upper frame assembly 20.

Figure 9:
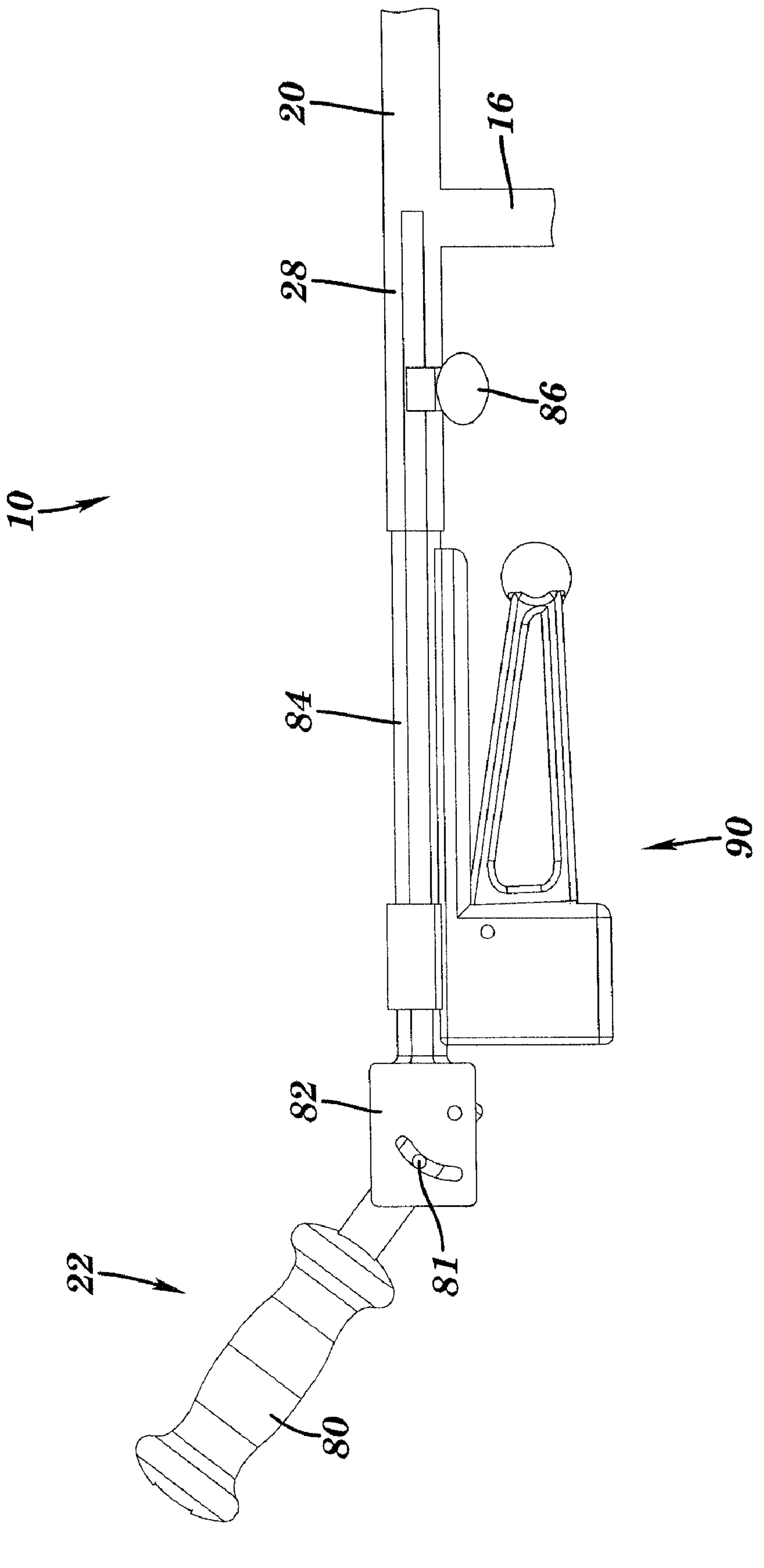
FIG. 9 is detailed view of a handle assembly that may be used in the walker shown in FIG. 1.

As shown in FIGS. 1-4, walker 10 typically also includes handle assemblies 22 mounted to upper frame assembly 20. Handle assemblies 22 provide a means for a user to grasp walker 10 when walker 10 is being used as a walker. FIG. 9 is a detailed view of a handle assembly 22 that may be used in walker 10 shown in FIG. 1. As shown in FIG. 3, handle assemblies 22 may typically be mounted beyond the extents of lower frame assembly 14, for example, beyond the location of wheels 15, to provide stability for the user. As shown in FIG. 9, handle assembly 22 includes a handle 80 pivotally mounted to a bracket 82, which is mounted to rod 84. The orientation of handle 80 may be varied by adjusting a setscrew 81 mounted in bracket 82. Rod 84 may telescopically engage member 28 of upper frame assembly 20. A setscrew 86 may be provided to retain rod 84 in a desired location within member 28, though other means of retaining rod 84 in member 28 may be provided.

As also shown in FIG. 9, walker 10 may also include hand brake assemblies 90. Handbrake assemblies 90 may be mounted to rod 84 and provide means for braking wheels 15. Handbrake assembly 90 may typically be a cable actuation system that, when handbrake assembly 90 is squeezed by the user, provides tension to a cable (not shown) that actuates a brake mechanism (not shown) mounted adjacent to one or more wheels 15, that is, in a manner similar to a conventional bicycle handbrake. As is typical, the brake mechanism may include a spring-biased lever that engages one or more wheels 15 to provide at least some friction to slow or stop the advancement of walker 10. In one aspect of the invention, hand brake assembly 90 provides dynamic braking, that is, the braking function provided is activated at all times, except when deactivated by the user. This dynamic braking will minimize or prevent accident or injury that could occur due to walker movement, for example, when the user is transferring weight to and from the seat assembly 32.

In addition to the aspects of the invention discussed above, a walker according to aspects of the invention may include other enhancements including, but not limited to, a tank support 100 shown in FIGS. 1-9, a padded back support mounted to frame assembly for comfort when sitting, and a basket may be added to the frame assembly to hold or carry personal items. These and other modifications and additions to walker 10 will be apparent to those of skill in the art.

The present invention provides a walker having a seat assembly that is adapted to assist the user in rising from a seated position or sitting from a standing position. Though illustrated and described as a posterior walker, aspects of the invention may also be applied to any type of walker or ambulatory assist device, including anterior walkers. The present invention provides capabilities and advantages lacking in the prior art. The capabilities and advantages of the present invention promise to become all the more significant with the expected increase in population of the elderly.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A walker comprising:

a frame assembly having:

a lower frame assembly adapted to contact the ground;

a plurality of uprights mounted to the lower frame assembly, the plurality of uprights comprising a plurality of front uprights and a plurality of rear uprights: and an upper frame assembly mounted to the plurality of uprights;

two handles mounted to the upper frame assembly, the two handles positioned to assist a user when walking;

a seat assembly having a first end pivotally mounted to the frame assembly, and a second end mounted to the rear uprights, wherein the first end of the seat assembly is pivotally mounted to the frame assembly by a plurality of bars, each of the plurality of bars having a first end pivotally mounted to the first end of the seat assembly and a second end pivotally mounted to the frame assembly; and means for assisting the user in rising from the seat assembly.

2. The walker as recited in claim 1, wherein the means for assisting the user comprises at least one gas spring having a first end comprising an extendable rod pivotally mounted to the seat assembly and a second end pivotally mounted to the lower frame assembly.

3. The walker as recited in claim 1, wherein the walker further comprises means for retracting the seat assembly.

4. The walker as recited in claim 1, wherein the second end of the seat assembly is slidably mounted to the rear uprights.

5. The walker as recited in claim 4, wherein the second end of the seat assembly includes a plurality of dowels and the rear uprights each include a slot adapted to receive one of the plurality of dowels to guide the slidable mounting of the seat assembly.

6. The walker as recited in claim 1, wherein means for assisting the user in rising from the seat assembly further comprises means for assisting the user in lowering onto the seat assembly.

7. The walker as recited in claim 1, wherein an elevation of the upper frame assembly is variable relative to the lower frame assembly.

8. The walker as recited in claim 7, wherein the rear uprights comprise lower uprights, upper uprights slidably engaging the lower uprights, and means for retaining the upper uprights.

9. The walker as recited in claim 1, wherein the lower frame assembly further comprises a plurality of wheels.

10. The walker as recited in claim 1, wherein the second end of the seat assembly is pivotally mounted to the rear uprights.

11. The walker as recited in claim 10, wherein the second end of the seat assembly is pivotally mounted to the rear uprights by a plurality of bars.

12. The walker as recited in claim 11, wherein each of the plurality of bars comprise a first end pivotally mounted to the second end of the seat assembly and a second end pivotally mounted to the rear uprights.

13. The walker as recited in claim 1, wherein the means for assisting the user comprises at least one gas spring having a first end slidably mounted to the seat assembly and a second end pivotally mounted to the frame assembly.

14. The walker as recited in claim 13, wherein the first end of the at least one gas spring is slidably mounted in a slot in a side member of the seat assembly.

15. The walker as recited in claim 1, wherein the means for assisting the user comprises a plurality of gas springs, each of the plurality of gas springs having a first end slidably mounted to the seat assembly and a second end pivotally mounted to the frame assembly.

16. A posterior walker comprising:

a frame assembly having:

a lower frame assembly having a plurality of wheels;

a plurality of uprights mounted to the lower frame assembly, the plurality of uprights comprising a plurality of front uprights and a plurality of rear uprights; and an upper frame assembly mounted to the plurality of uprights;

two handles mounted to the upper frame assembly, the two handles positioned to assist a user when walking;

a seat assembly having a first end pivotally mounted to the lower frame assembly by a plurality of bars, and a second end slidably mounted to slots in the rear uprights; and at least one gas spring having a first end comprising an extendable rod pivotally mounted to the seat assembly and a second end pivotally mounted to the lower frame assembly.

17. The walker as recited in claim 16, wherein the second end of the seat assembly includes a plurality of dowels and each of the slots of the rear uprights are adapted to receive one of the plurality of dowels to guide the slidable mounting of the seat assembly.

18. The walker as recited in claim 16, wherein an elevation of the upper frame assembly is variable relative to the lower frame assembly.

19. The walker as recited in claim 18, wherein the rear uprights comprise lower uprights, upper uprights slidably engaging the lower uprights, and means for retaining the upper uprights in the lower uprights at an elevation.

20. A walker comprising:

a frame assembly having:

a lower frame assembly adapted to contact the ground;

a plurality of uprights mounted to the lower frame assembly, the plurality of uprights comprising a plurality of front uprights and a plurality of rear uprights: and an upper frame assembly mounted to the plurality of uprights;

two handles mounted to the upper frame assembly, the two handles positioned to assist a user when walking;

a seat assembly having a first end pivotally mounted to the frame assembly, and a second end slidably mounted to the rear uprights; and means for assisting the user in rising from the seat assembly.

21. The walker as recited in claim 20, wherein the second end of the seat assembly includes a plurality of dowels and the rear uprights each include a slot adapted to receive one of the plurality of dowels to guide the slidable mounting of the seat assembly.

22. The walker as recited in claim 20, wherein the means for assisting the user comprises at least one gas spring having a first end comprising an extendable rod pivotally mounted to the seat assembly and a second end pivotally mounted to the lower frame assembly.

23. The walker as recited in claim 20, wherein the walker further comprises means for retracting the seat assembly.

24. The walker as recited in claim 20, wherein the first end of the seat assembly is pivotally mounted to the frame assembly by a plurality of bars, each of the plurality of bars having a first end pivotally mounted to the first end of the seat assembly and a second end pivotally mounted to the frame assembly.

25. A walker comprising:

a frame assembly having:

a lower frame assembly adapted to contact the ground;

a plurality of uprights mounted to the lower frame assembly, the plurality of uprights comprising a plurality of front uprights and a plurality of rear uprights, wherein the rear uprights comprise lower uprights, upper uprights slidably engaging the lower uprights, and means for retaining the upper uprights; and an upper frame assembly mounted to the plurality of uprights, wherein an elevation of the upper frame assembly is variable relative to the lower frame assembly;

two handles mounted to the upper frame assembly, the two handles positioned to assist a user when walking;

a seat assembly having a first end pivotally mounted to the frame assembly, and a second end mounted to the rear uprights; and means for assisting the user in rising from the seat assembly.

26. The walker as recited in claim 25, wherein the means for assisting the user comprises at least one gas spring having a first end comprising an extendable rod pivotally mounted to the seat assembly and a second end pivotally mounted to the lower frame assembly.

27. The walker as recited in claim 25, wherein the walker further comprises means for retracting the seat assembly.

28. The walker as recited in claim 25, wherein the first end of the seat assembly is pivotally mounted to the frame assembly by a plurality of bars, each of the plurality of bars having a first end pivotally mounted to the first end of the seat assembly and a second end pivotally mounted to the frame assembly.

29. The walker as recited in claim 25, wherein the second end of the seat assembly is pivotally mounted to the rear uprights.

30. The walker as recited in claim 29, wherein the second end of the seat assembly is pivotally mounted to the rear uprights by a plurality of bars.

31. The walker as recited in claim 30, wherein each of the plurality of bars comprise a first end pivotally mounted to the second end of the seat assembly and a second end pivotally mounted to the rear uprights.

32. The walker as recited in claim 25, wherein the means for assisting the user comprises at least one gas spring having a first end slidably mounted to the seat assembly and a second end pivotally mounted to the frame assembly.

33. The walker as recited in claim 32, wherein the first end of the at least one gas spring is slidably mounted in a slot in a side member of the seat assembly.

34. he walker as recited in claim 25, wherein the means for assisting the user comprises a plurality of gas springs, each of the plurality of gas springs having a first end slidably mounted to the seat assembly and a second end pivotally mounted to the frame assembly.

* * * * *